No. 618,135. Patented Jan. 24, 1899.
J. SAUNDERS & S. CHENAULT.
MEASURING INSTRUMENT.
(Application filed Oct. 14, 1897.)
(No Model.)
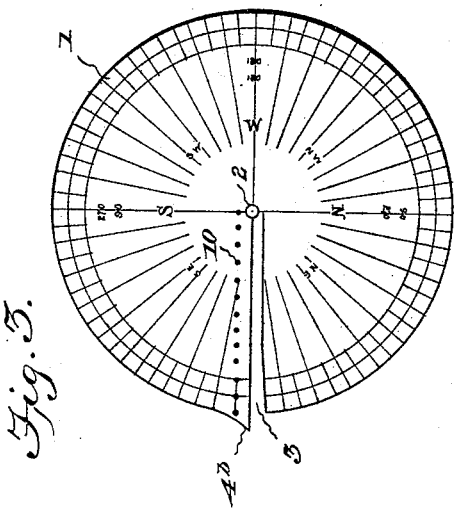
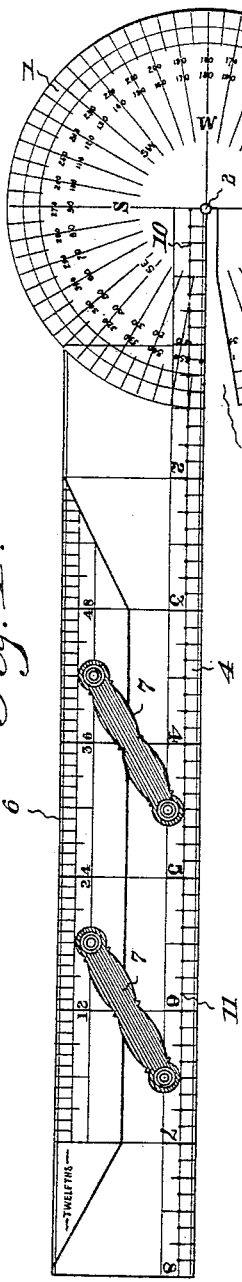
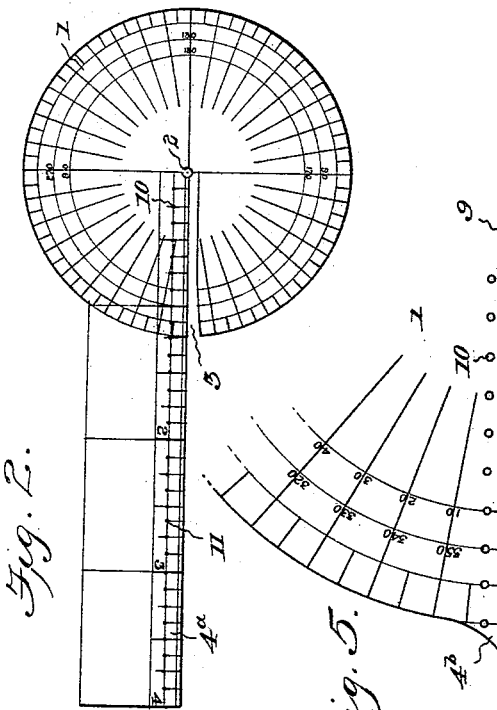
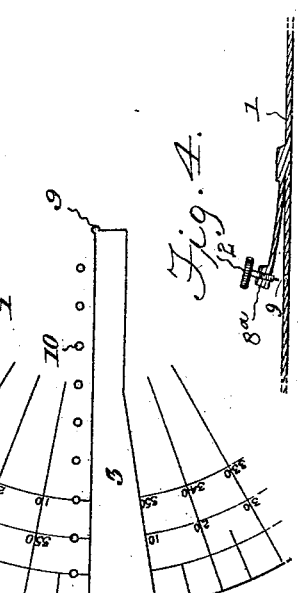
Witnesses
E. H. Monroe
D. E. Hoyle
Inventors
Stephen Chenault
James Saunders,
By their Attorneys,
C. A. Snow & Co.

UNITED STATES PATENT OFFICE.

JAMES SAUNDERS AND STEPHEN CHENAULT, OF ORANGE, TEXAS.

MEASURING INSTRUMENT.

SPECIFICATION forming part of Letters Patent No. 618,135, dated January 24, 1899.

Application filed October 14, 1897. Serial No. 655,217. (No model.)

*To all whom it may concern:*

Be it known that we, JAMES SAUNDERS and STEPHEN CHENAULT, citizens of the United States, residing at Orange, in the county of Orange and State of Texas, have invented a new and useful Measuring Instrument, of which the following is a specification.

Our invention relates to measuring instruments, and particularly to drafting implements designed for the use of draftsmen, surveyors, plotters, and navigators; and the object in view is to provide a simple and improved construction of angle-measuring device or protractor capable of measuring angles of any size around a given point and so constructed as to provide for running lines inwardly to the said center.

Further objects and advantages of this invention will appear in the following description, and the novel features thereof will be particularly pointed out in the appended claims.

In the drawings, Figure 1 is a plan view of a drafting instrument constructed in accordance with our invention and showing the parallel-ruler type of arm. Fig. 2 is a similar view of the improved instrument, showing the single-ruler type of arm. Fig. 3 is a similar view showing an armless instrument. Fig. 4 is a detail sectional view to show the center-pin or needle and the means for supporting the same. Fig. 5 is a detail view of a portion of the armless instrument, showing the pencil-opening, the center-pin being omitted to show the guide-opening.

Similar reference characters indicate corresponding parts in all the figures of the drawings.

1 designates a continuous or circular protractor adapted for measuring angles of three hundred and sixty degrees and provided at its center with a pin or needle 2, whereon it is adapted to be turned in the course of measuring angles. This pin extends through a central guide opening or socket 9, formed in the disk, and also formed in the disk is a radial slot 3, one edge of which is arranged accurately on a line radiating from the center of the disk and said central guide-opening, and attached to the disk may be an arm 4, having one edge accurately alined with said radial edge of the slot to provide for continuing a radial line outwardly beyond the periphery of the disk. It is obvious that the slot provides for extending radial lines inwardly from the periphery of the disk to its center, and thus enables the instrument to be used in plotting lines from a given center and at the given angle without the inconvenience of first laying off the angle and then substituting a straight edge alined with the points first made to form the line.

In the construction illustrated in Fig. 1 we employ an arm having a main member which is rigidly connected with the disk and an auxiliary member 6, connected with the main member by links 7 to form a parallel ruler, either or both of the members being graduated to form the desired divisions, as may be required by the particular object for which the instrument is designed.

In Fig. 2 the arm is of integral construction and consists simply of a single ruler $4^a$, while in Fig. 3 the disk is armless and is simply provided with an index-point $4^b$.

The construction of center-point used in connection with the instrument as above described is shown in detail in Fig. 4, wherein the pin 2 is adjustably fitted, as by threading, in a socket formed in an enlargement 8 on a supporting-arm $8^a$ and is fitted at its upper end with a milled head to facilitate adjustment.

The central pin socket or opening 9, which is clearly shown in Fig. 5, wherein the center-pin is omitted, consists of a three-quarter circle, owing to the fact that the radial slot breaks into the socket or opening, and thus by reason of the arrangement of one side of the slot upon a radial line of the disk involves the cutting away of one-fourth of the circular wall of the socket or opening. The remaining three-quarter wall of the socket or opening, however, is sufficient to hold a pin in the desired position against vibration and displacement to constitute a center for the disk and at the same time enable the draftsman to draw a line from the center of the disk to its periphery.

It is often desirable to lay off circles or arcs concentric with the disk and either within or without the periphery thereof, and hence we provide the disk with a series of perforations 10 (see particularly Fig. 5) and the arms with a corresponding series of perforations 11, adapted to receive the point of a marking instrument, such as a pencil, the perforations being arranged on graduations of the scales, which are disposed parallel with said straight edges. The radial straight edge of the disk is also graduated to indicate linear measurements. Thus by arranging the center-point of the disk at a given point on a chart or other surface upon which plotting or drafting is to be performed angles radiating from this center may be laid off and the lines extended to the desired points without displacing the instrument or substituting any instrument designed for an analogous purpose, and in addition to this circles concentric with the disk and at any desired distance from the center thereof may be laid off without removing the center-point from its position.

In order to facilitate the drafting of lines to the center of the disk, we preferably construct the above-described supporting-arm 8$^a$ of spring metal, constituting a retracting support for the center-pin, whereby in order to bring the center-pin into operative position it is necessary to depress it manually to extend its lower end beyond the plane of the lower surface of the disk. After the angular adjustment of the instrument about the point 2 as a center the removal of pressure from the center-point will allow the retracting support 8$^a$ to elevate the same, and thus enable a marking instrument, such as a pencil, to be moved through the slot 3 quite to the center of the disk. The center-point 2 is preferably threaded in an enlargement of the supporting-arm 8$^a$ in order to provide for adjustment to compensate for wear and to secure the desired exposure of the point below the plane of the plate. In the construction illustrated the supporting-arm consists of a plate-spring riveted or otherwise permanently secured to the disk; but it is obvious that the essential feature of this portion of the construction is a supporting-arm movably mounted to provide for bringing the center-point into operative position when required and at the same time allow the removal thereof from the center of the disk when it is desired to extend a line to said center.

Various changes in the form, proportion, and the minor details of construction may be resorted to without departing from the spirit or sacrificing any of the advantages of the invention.

Having described our invention, what we claim is—

1. A measuring instrument having a disk forming a circular protractor provided with a radial slot of which one side forms a straight edge, and having a central guide-opening, and a center-point consisting of a pin or needle movably supported above and in alinement with said central opening by a movable arm carried by the disk, substantially as specified.

2. A measuring instrument having a disk forming a circular protractor provided with a radial slot of which one side forms a straight edge, and which terminates at its inner end in a central opening of the disk, and a center-point, consisting of a pin or needle, adjustably fitted in a movable spring-supported socket mounted upon the disk for normal arrangement above the disk, and adapted to be manually depressed to extend the point of said pin or needle through the central opening of the disk and below the plane of the under surface of the same, substantially as specified.

3. A measuring instrument having a disk forming a circular protractor provided with a radial slot of which one side forms a straight edge, a center-point, consisting of a pin or needle, adapted to project through a central opening in the disk, and a retracting arm carried by the disk and supporting the center-point, said supporting-arm being of spring metal, substantially as specified.

In testimony that we claim the foregoing as our own we have hereto affixed our signatures in the presence of two witnesses.

JAMES SAUNDERS.
STEPHEN CHENAULT.

Witnesses:
J. P. TATUM,
L. L. EMERY.